United States Patent [19]
Kittell et al.

[11] Patent Number: 5,448,662
[45] Date of Patent: Sep. 5, 1995

[54] APPARATUS FOR COUPLING AN OPTICAL FIBER TO A STRUCTURE AT A DESIRED ANGLE

[75] Inventors: David H. Kittell, Stamford; Guy H. Hayes, Winsted, both of Conn.; Peter J. DeGroot, Belleview, Wash.

[73] Assignee: Hughes Aircraft Company, Los Angeles, Calif.

[21] Appl. No.: 21,711

[22] Filed: Feb. 24, 1993

Related U.S. Application Data

[62] Division of Ser. No. 834,758, Feb. 12, 1992, Pat. No. 5,239,366.

[51] Int. Cl.$^6$ .......................... G02B 6/38; G02B 6/36
[52] U.S. Cl. ................................. 385/25; 385/75; 385/76; 385/90; 385/137
[58] Field of Search .................. 385/25, 75, 90, 53–76, 385/88–94, 136–140, 147

[56] References Cited

U.S. PATENT DOCUMENTS

| | | | |
|---|---|---|---|
| 4,303,301 | 12/1981 | Teichert et al. | 385/75 |
| 4,909,589 | 3/1990 | Morris | 385/25 |
| 5,095,517 | 3/1992 | Monguzzi et al. | 385/90 |
| 5,138,676 | 8/1992 | Stowe et al. | 385/32 |
| 5,147,348 | 9/1992 | Leckrone et al. | 385/90 |
| 5,239,366 | 8/1993 | Kittell et al. | 385/78 |
| 5,293,438 | 3/1994 | Konno et al. | 385/61 |

FOREIGN PATENT DOCUMENTS

| | | | |
|---|---|---|---|
| 60-78410 | 5/1985 | Japan | 385/90 |
| 1-96610 | 4/1989 | Japan | 385/90 |

*Primary Examiner*—William Mintel
*Assistant Examiner*—Minhloan Tran
*Attorney, Agent, or Firm*—W. C. Schubert; W. K. Denson-Low

[57] ABSTRACT

Optical metrology apparatus, specifically a laser probe (1), includes a frame (10) comprised of a material selected to have a predetermined coefficient of thermal expansion. A beamsplitter (36) is coupled to the frame for generating a sample beam optical path (D) and a reference beam optical path (C). The beamsplitter is optically coupled to an optical fiber (12) that delivers radiation to and conveys radiation from the frame. A piezoelectric stack (48) has an excitation signal coupled thereto and includes a mirror (26) for phase modulating the reference beam optical path length in response to the excitation signal. The laser probe includes a first strain gauge (58) that is coupled to the piezoelectric stack and a second strain gauge (60) that is coupled to the frame. A closed loop control system (A1, A2, A3, A4, VR) varies the excitation signal in accordance with the detected strains so as to maintain the reference beam optical path length in a predetermined relationship to a path length of the sample beam optical path. This athermalizes the probe, in that any expansion or contraction of the frame is matched by the piezoelectric stack, yielding a net zero change in the non-common beam path lengths. The apparatus includes an optical fiber support (14) that is rotatably coupled to the frame for positioning the optical fiber at a desired angular position.

2 Claims, 3 Drawing Sheets

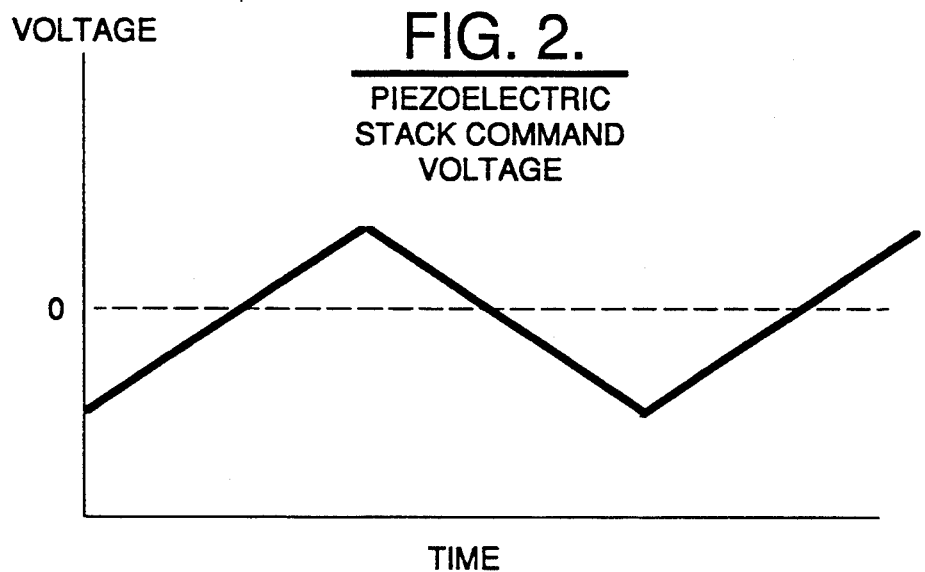
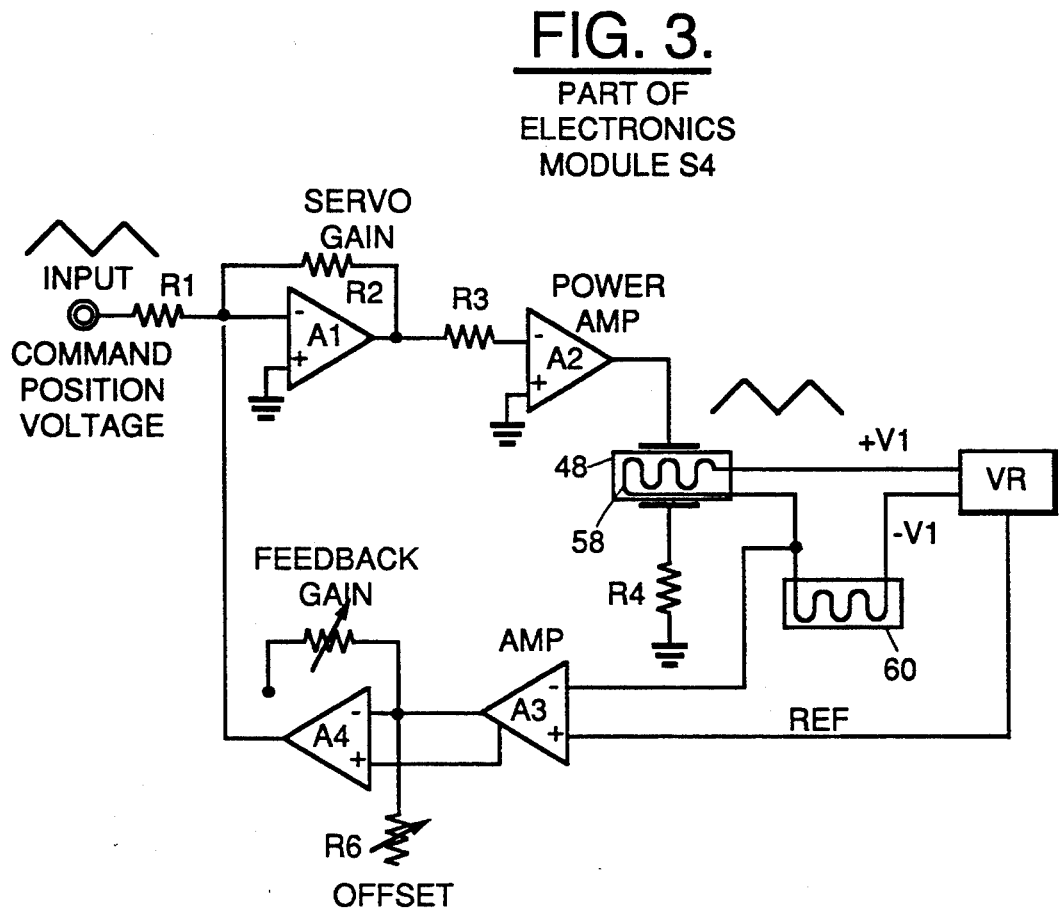

APPARATUS FOR COUPLING AN OPTICAL FIBER TO A STRUCTURE AT A DESIRED ANGLE

This is a division of application Ser. No. 07/834,758, filed Feb. 12, 1992, now U.S. Pat. No. 5,239,366.

FIELD OF THE INVENTION

This invention relates generally to optical metrology apparatus and, in particular, to a laser probe reference beam modulator.

BACKGROUND OF THE INVENTION

An important aspect of a profilometer system is that the system be insensitive to thermally-induced drift errors. Another important aspect, for many applications, is that the profilometer system be relatively compact and consume a small amount of electrical power.

One known type of system has a single laser diode source whose output is focussed onto a sample using piezoelectrically driven focussing element(s). The scattered or reflected light is imaged by the focussing element(s) onto a quad cell focus detector, and the sample surface profile is acquired by monitoring the position of the focussing element(s).

One drawback to this "laser stylus" is a limited range/resolution ratio of 1000/1 for any resolution setting. For example, a one micron range provides one nanometer of resolution.

It is thus one object of this invention to provide a low power, compact laser probe that is substantially immune to thermally-induced errors.

It is another object of this invention to provide a low power, compact laser probe having a large dynamic range/resolution of at least ($10^5$:1).

It is another object of this invention to provide a low power, compact laser probe suitable for use in, by example, remote ranging and robotics control applications, in-situ metrology applications, as a replacement for conventional contact-type probes, or for use as an alignment device in semiconductor processing applications, such as in mask alignment and/or wafer positioning.

It is a further object of the invention to provide a low power, compact laser probe suitable for use as a high resolution non-contact profiler for semiconductor and other applications.

SUMMARY OF THE INVENTION

The foregoing and other problems are overcome and the objects of the invention are realized by a compact probe reference beam modulator that includes a strain gauge feedback circuit to maintain a desired reference cavity length as the probe body expands or contracts. The strain gauge feedback results in a substantially athermalized probe. Furthermore, the probe body is manufactured from a material having a low coefficient of thermal expansion so as to further improve mechanical and optical stability of the system and to provide immunity to thermal gradients.

Reducing thermal expansion contributions to the measurement uncertainty significantly improves the precision of measurement. The compact size improves the versatility of the profilometer. The use of a low voltage modulator also reduces power requirements for the profilometer system.

More specifically, the invention provides optical metrology apparatus, specifically a laser probe, and includes a frame comprised of a material selected to have a predetermined coefficient of thermal expansion. A beamsplitter is coupled to the frame for generating a sample beam optical path and a reference beam optical path. The beamsplitter is optically coupled to an optical fiber that delivers radiation to and conveys radiation from the frame. A piezoelectric stack has an excitation signal coupled thereto and includes a mirror for phase modulating the reference beam optical path length in response to the excitation signal. The laser probe includes a first strain gauge that is coupled to the piezoelectric stack and a second strain gauge that is coupled to the frame. A closed loop control system varies the excitation signal in accordance with the detected strains so as to maintain the reference beam optical path length in a predetermined relationship to a path length of the sample beam optical path.

This technique effectively athermalizes the probe, in that any expansion or contraction of the frame is matched by the piezoelectric stack, yielding a net zero change in non-common beam path lengths. This athermalization technique substantially reduces thermal drift uncertainties in the profilometry data.

Also disclosed is apparatus for coupling an optical fiber to a structure. The apparatus includes an optical fiber support for supporting a terminal end of an optical fiber. The optical fiber support has a shape for being rotatably coupled to the structure for positioning the terminal end of the optical fiber in a desired angular relationship with a surface of the structure. The optical fiber support further includes a clamp mechanism for fixing the optical fiber support at the desired angular relationship with the surface of the structure.

BRIEF DESCRIPTION OF THE DRAWING

The above set forth and other features of the invention are made more apparent in the ensuing Detailed Description of the Invention when read in conjunction with the attached Drawing, wherein:

FIG. 2 is graph illustrating a variation in piezoelectric stack command voltage;

FIG. 3 is a simplified schematic diagram of circuitry that responds to the command voltage of FIG. 2 to provide closed loop position control for a reference laser beam modulator.

DETAILED DESCRIPTION OF THE INVENTION

Figure 1:
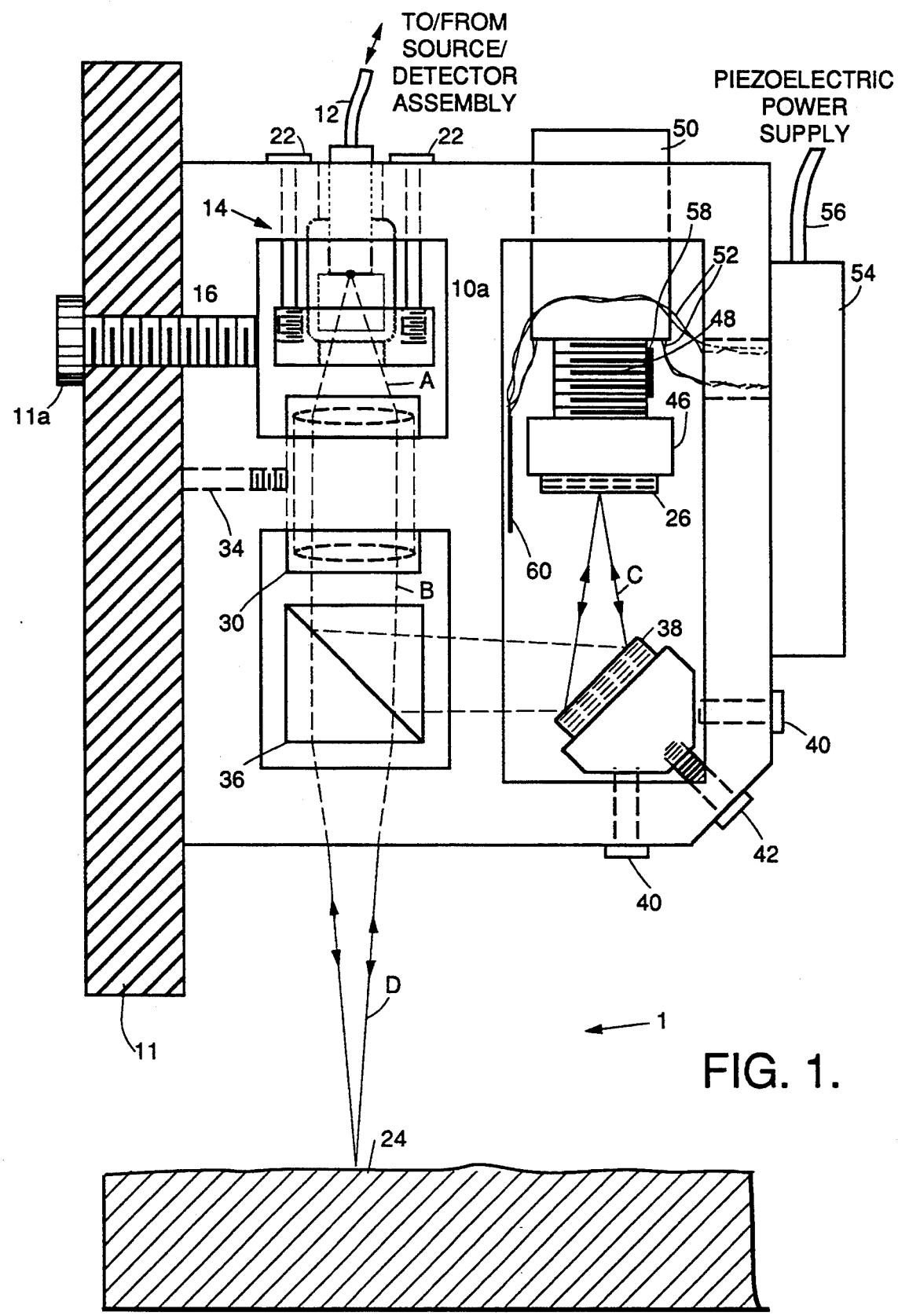
FIG. 1 is a top view illustrating the compact laser probe of the invention.

Referring to FIG. 1 there is illustrated a top view of a compact laser probe 1 that is constructed and operated in accordance with the invention.

A frame, or probe body 10, is fabricated from, preferably, a single piece of material having a low coefficient of thermal expansion. In a presently preferred embodiment of the invention this material is super-invar, although the practice of the invention is not limited to only this particular material. The body 10 is machined to maintain the stable (dimensional and thermal) characteristics of this presently preferred material. Components contained within the probe body 10 are also comprised, where feasible, of the same material as the probe body 10 in order to minimize any material mismatches with the probe body 10. The probe body 10 is mounted to a bed 11 using a single ¼—20 bolt 11a to preserve the dimensional stability of the probe body 10. Approximate dimensions of the probe body 10 are a length of 6.5 cm., a width of 5.0 cm., and a height of 1.5 cm.

An optical fiber 12 transmits laser diode light from a source-detector assembly (not shown) and also transmits combined reference and sample beam light back to the source-detector assembly. One suitable embodiment for the source-detector assembly 10 is described in commonly assigned U.S. Pat. No. 5,153,669, filed Mar. 27, 1991, entitled "Three Wavelength Optical Measurement Apparatus and Method" by Peter J. de Groot.

The optical fiber 12 is aligned to optical elements within the laser probe 1 with a fiber positioning assembly 14. Positioning assembly 14 includes a limited motion "ball" 16 for angular adjustment of the fiber 12, a clamp mechanism 18, and a fiber support mandril 20. After the fiber 12 is positioned in the support mandril 20, clamp screws 22 are loosened to permit adjustment of the ball 16. After the fiber 12 angle is correctly adjusted the clamp screws 22 are tightened to secure the ball 16 at the desired position.

Figure 4:
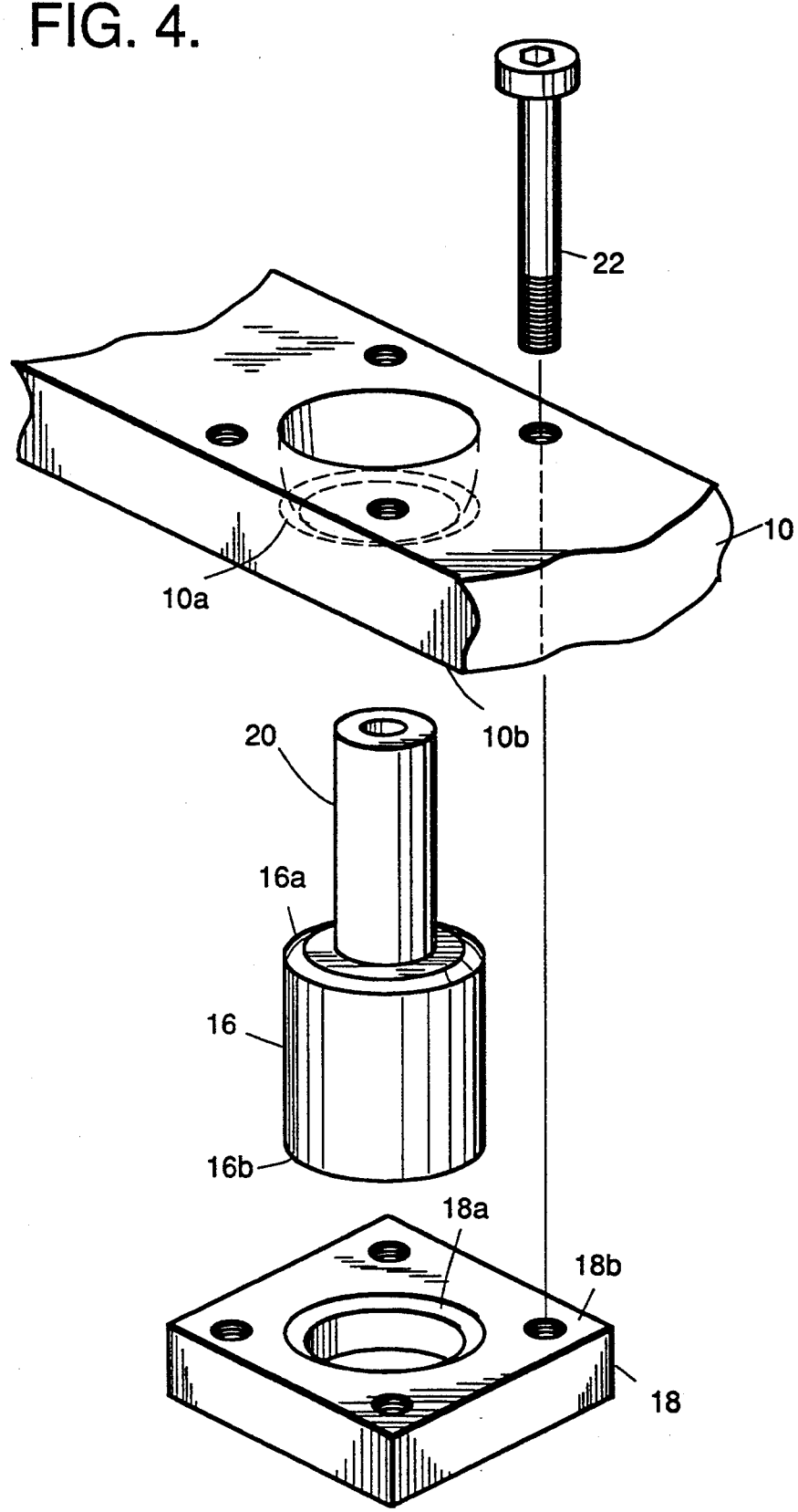
FIG. 4 is an exploded view of a compact fiber positioner that is a component of the compact laser probe of FIG. 1.

FIG. 4 shows an exploded view of a presently preferred embodiment of the fiber positioning assembly 14. The fiber support mandril 20 is press fit into the limited motion ball 16. As shown in FIG. 4, ball 16 is an elongated member, preferably having a cylindrical body which terminates in rounded first and second ends 16a and 16b. In this connection, the term elongated means having a rectangular or other long, nonspherical cross section. In addition ends 16a and 16b are slightly rounded, i.e. have a tapered roundness which somewhat narrows the ends 16a, 16b of ball 16. The mandril 20 serves to support the fiber (not shown) and to adjust the angular position of the ball 16. The ball 16 is fabricated, by example, by milling a ball bearing to form a substantially cylindrical shape. The ball 16 may also be fabricated by forming a rounded edge on upper and lower edges of a rod. By whatever method the ball 16 is fabricated, the end result is that a first end 16a is provided with an edge having a radius of curvature, and with a second end 16b having an edge with a radius of curvature. The radius of curvature of edges 16a and 16b are typically made equal to one another, although they need not be.

The positioning fixture is comprised of the probe body 10, the clamp 18, and the four clamping bolts 22, only one of which is shown in FIG. 4. A spherical recess or seat 10a, having a radius of curvature that is slightly larger than the radius of curvature of the rounded edge 16a, is milled into a surface 10b of the probe body 10. A second, similar spherical seat 18a is milled into a surface 18b of the clamp 18 for receiving the edge 16b. The clamp 18 is preferably fabricated from the same material as the probe body 10 so as to improve the stability of the fiber positioner.

A result of this mechanical configuration is that the ball 16, and the fiber containing mandril 20, are rotatably coupled to the probe body 10 and are thus adjustably positionable for setting the terminal end of the fiber 12 at a desired angular relationship with the surface 10b. After setting the fiber 12 at a desired angular position, bolts 22 are tightened to fix the ball 16 at the desired position.

The laser light exiting the terminal end of the fiber 12, indicated by the letter A, is focussed on a sample surface 24, and also on a reference mirror 26, by a lens assembly 28. The lens assembly 28 includes a super-invar lens cell 30 in which are mounted one or more imaging lenses 32.

Focus is adjusted by sliding the lens cell 30 within the probe body 10. After determining a desired position for the lens cell 30, the lens cell 30 is clamped with set screws 34. The "working distance" of the laser probe 1 is thus fine adjusted by moving the lens cell assembly 28 to focus the light from the fiber 12 onto an optical flat positioned at the desired working distance at which the sample surface 24 will be subsequently positioned. A nominal working distance is 2.5 cm. The correct focal position is determined by monitoring the signal strength at the source/detector assembly, while positioning the lens cell 30, until a maximum signal amplitude is obtained.

The light exiting the lens cell 30, indicated by the letter B, is split into a reference beam (C) and an object beam (D) by a polarizing beam splitter 36. The reference beam (C) is reflected from a fold mirror 38 to the reference mirror 26. The angle of the fold mirror 38 adjusted with pitch adjustment/locking screws 40 and roll adjustment/locking screws 42. These screws (40, 42) connect a mirror support 44 to the probe body 10.

The reference mirror 26 is mounted on a modulation stage 46. The modulation stage 46 is supported upon a low-voltage piezoelectric stack 48 mounted within a tube 50 comprised of, preferably, the same material as the probe body 10. The piezoelectric stack 50 is coupled via wiring 52 to an electronics package 54 which is connected to a remote power supply (not shown) by cable assembly 56.

The reference beam path length is adjusted by moving the piezoelectric stack 48 to a provide a focal spot of the reference beam, with a nominal path length of 2.5 cm. As in the focus adjustment of the sample beam, the signal at the source detector assembly is monitored and the reference beam focus is achieved when this signal is at a maximum. The sample beam is preferably blocked during this adjustment.

In operation, light reflected from the reference mirror 26 and from the surface of the sample 24 is recombined in the polarizing beam splitter 36 and coupled into the fiber 12 by the lens assembly 28. The combined light is then interferometrically compared at the source/detector assembly so as to determine a displacement of the sample surface 24, relative to the beamsplitter 36. This displacement is indicative of a range to, or a characteristic of, the sample surface 24.

In accordance with an aspect of the invention, the low-voltage piezoelectric stack 50 modulator for the reference mirror 26 is controlled by two signals: a dc bias signal and an ac modulation signal. The dc bias signal controls a nominal length of the piezoelectric stack 48 while the ac modulation signal controls a range of motion of the stack 48 about the nominal length. One suitable frequency for the ac modulation signal is 5 Hz. Fine focus adjustments for the reference channel are made by adjusting the dc bias voltage and, hence, the nominal length of the piezoelectric stack 48.

The piezoelectric stack control electronics 54 employs the output of a strain gauge 58 on the piezoelectric stack 48 modulator to maintain the motion linear with ac modulation voltage. The electronics 54 use the output of a similar strain gauge 60 located on the super-invar probe body 10 to adjust the dc bias voltage applied to the piezoelectric stack 48 modulator to simultaneously compensate for any length changes in the probe body 10. This technique stabilizes the piezoelectric material of the stack 48 to the super-invar material of the probe body 10, thereby athermalizing the reference beam path. Signals from the control electronics 54 are transmitted to the low noise piezoelectric power supplies via the electrical cable assembly 56.

That is, the piezoelectric stack 48 modulator is controlled with the first strain gauge 58 attached to the piezoelectric stack 48 and with the second strain gauge 60 that is attached to the central rib 10a of the probe body 10. This technique provides for the athermalization of the piezoelectric stack 48 in that the second strain gauge 60, attached to the super invar probe body 10, is used to provide a dc offset to the ac modulation voltage applied to the piezoelectric stack 48.

This is shown in the waveform diagram of FIG. 2 and in the simplified schematic diagram of FIG. 3. In that the presently preferred material for the probe body 10 is super-invar, which has a negative coefficient of thermal expansion, the dc bias voltage decreases as temperature increases. If the selected material has a positive coefficient of thermal expansion, the dc bias voltage is caused to increase with increasing temperature. The end result is that the dc offset voltage changes the zero-modulation length of the piezoelectric stack 48 such that the piezoelectric material of the stack 48 "behaves" in a fashion similar to the super invar of the probe body 10.

The waveform of FIG. 2 shows an exemplary command voltage that drives the piezoelectric stack 48. The command voltage is nominally a saw tooth waveform having a frequency of, for example, 5 Hz.

The closed loop control system of FIG. 3 drives the piezoelectric stack 48. The piezoelectric stack command position voltage is applied to an input terminal and, through a resistor R1, to an error amplifier A1. Error amplifier A1 includes a potentiometer R2 for adjusting the servo gain of the servo loop. The output of the error amplifier is applied through resistor R3 to a power amplifier A2. The output of amplifier A2 is a current that is proportional to the output of the error amplifier A1. This current is applied to the piezoelectric stack 48 which integrates same and which changes its position (length) in response to the sawtooth drive signal. The piezoelectric stack 48 is coupled to ground through a resistor R4. Mounted to the piezoelectric stack 48, for sensing a change in length thereof, is the strain gauge 58. Strain gauge 58, in conjunction with the strain gauge 60 that is mounted to the super-invar body 10, form two legs of a balanced bridge circuit. For the presently preferred embodiment each strain gauge (58, 60) has a nominal, unstrained, resistance of 350 Ohms. An input node of each of the strain gauges is coupled to a voltage reference (VR) that provides a positive reference voltage to an input node of the strain gauge 58 and an equal, but opposite, potential to an input node of the strain gauge 60. An instrumentation amplifier A3 is coupled to a node that is connected between an output node of each of the strain gauges 58 and 60. A second input to the amplifier A3 is coupled to a reference voltage that is output by VR. This reference voltage is nominally zero volts. A3 amplifies a difference voltage obtained from the ½ bridge circuit formed by strain gauges 58 and 60. The magnitude of the difference voltage is a function of the difference in strain applied to the strain gauges 58 and 60 due to the commanded change in length of the piezoelectric stack 48 and, in accordance with an aspect of the invention, a thermal expansion or contraction of the super-invar body 10. This error voltage is coupled to amplifier A4. A4 includes a potentiometer R5 for adjusting the feedback gain and a potentiometer R6 for adjusting the offset (zero). The output of amplifier A4 is coupled to the input of amplifier A1 for closing the servo loop around the mirror 26 that is coupled to the piezoelectric stack 48.

This technique effectively athermalizes the probe 1, in that any expansion or contraction of the super-invar is matched by the piezoelectric stack 48, yielding a net zero change in the non-common beam path lengths. This athermalization technique substantially reduces thermal drift uncertainties in the profilometry data.

The open cell construction of the compact probe 1 also beneficially reduces atmospheric effect uncertainties in the profilometry data, in that both reference beam and sample beam paths have common atmospheres.

These techniques thus yield a low power, compact laser probe that is substantially immune to thermally-induced errors, and which exhibits a large dynamic range/resolution of at least ($10^5$:1). As a result, the compact laser probe 1 is well suited for use in the exemplary applications set forth in the objects of the invention listed above.

While the invention has been particularly shown and described with respect to a presently preferred embodiment thereof, it will be understood by those skilled in the art that changes in form and details may be made therein without departing from the scope and spirit of the invention.

What is claimed is:

1. Apparatus for coupling an optical fiber to a structure comprising:
   a fiber support mandrill for securable receiving said optical fiber;
   an elongated ball member having an elongated body and a first end for receiving said mandrill and a tapered, slightly rounded second end;
   a clamp having a rounded recess for receiving said slightly rounded second end such that said ball member and mandrill rotate said optical fiber to the desired angle relative to a surface of the structure; and
   means for securing said clamp to said structure to fix the desired angle.

2. The apparatus of claim 1 wherein said first end is slightly rounded.

* * * * *